(12) United States Patent
Ganguly et al.

(10) Patent No.: US 10,503,200 B2
(45) Date of Patent: Dec. 10, 2019

(54) DEVICES AND SYSTEMS FOR PREVENTING MISALIGNMENT IN VEHICLE BRAKE ASSEMBLIES

(71) Applicant: FORD GLOBAL TECHNOLOGIES, LLC, Dearborn, MI (US)

(72) Inventors: Snehasis Ganguly, Canton, MI (US); Curtis Hargitt', Howell, MI (US); Brian Marvin Lemmer, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 292 days.

(21) Appl. No.: 14/276,760

(22) Filed: May 13, 2014

(65) Prior Publication Data

US 2015/0331442 A1    Nov. 19, 2015

(51) Int. Cl.
*B60T 7/06*      (2006.01)
*G05G 1/50*     (2008.04)
*B60T 17/00*    (2006.01)
*B60T 7/04*      (2006.01)
(Continued)

(52) U.S. Cl.
CPC .............. *G05G 1/506* (2013.01); *B60T 7/042* (2013.01); *B60T 7/06* (2013.01); *B60T 11/18* (2013.01); *B60T 17/00* (2013.01); *G05G 1/46* (2013.01); *Y10T 29/49897* (2015.01); *Y10T 74/20528* (2015.01)

(58) Field of Classification Search
CPC . Y10T 74/20528–2054; Y10T 74/2088; Y10T 403/1608; Y10T 403/1616; B60T 7/06; B60T 17/00; B60T 11/18; G05G 1/30; G05G 1/44; G05G 1/445; G05G 1/46; G05G 1/50; G05G 1/506
See application file for complete search history.

(56) References Cited

U.S. PATENT DOCUMENTS

| | | |
|---|---|---|
| 3,388,610 A | 6/1968 | Pyle et al. |
| 8,607,660 B2 | 12/2013 | Khan et al. |
| 2012/0102942 A1 | 5/2012 | Sellinger et al. |

(Continued)

FOREIGN PATENT DOCUMENTS

| | | |
|---|---|---|
| CN | 101100179 A | 1/2008 |
| DE | 19849685 A1 | 9/1999 |

(Continued)

OTHER PUBLICATIONS

Machine translation of FR 2887837, obtained Jul. 11, 2015.*
(Continued)

*Primary Examiner* — Richard W Ridley
*Assistant Examiner* — Brian J McGovern
(74) *Attorney, Agent, or Firm* — Jones Robb, PLLC; Raymond Coppiellie

(57) ABSTRACT

An alignment device may include a saddle element configured to sit on a pedal arm of a brake assembly. The saddle element may include first and second U-shaped ends configured to receive the pedal arm. The first and second U-shaped ends may be spaced apart from one another by an opening defined by first and second lateral wing elements. The first and second lateral wing elements may form a catchment area configured to guide and position a push rod of a brake booster into alignment with the pedal arm.

7 Claims, 5 Drawing Sheets

(51) Int. Cl.
  *B60T 11/18*  (2006.01)
  *G05G 1/46*  (2008.04)

(56) References Cited

U.S. PATENT DOCUMENTS

| 2015/0000458 A1 | 1/2015 | Ganguly et al. |
| 2017/0182983 A1 | 6/2017 | Ganguly et al. |

FOREIGN PATENT DOCUMENTS

| DE | 102010049866 A1 | | 1/2006 |
| DE | 102010002850 A1 | | 8/2011 |
| EP | 1440857 B1 | | 10/2005 |
| FR | 2887837 A1 | * | 1/2007 |
| FR | 2893291 A1 | * | 5/2007 |
| KR | 10-2006-0002429 | | 1/2006 |

OTHER PUBLICATIONS

Machine translation of FR 2893291, obtained Jul. 11, 2015.*
Advisory Action dated Mar. 9, 2017 from co-pending U.S. Appl. No. 14/311,792.
Snehasis Gangley et al. "Devices and Systems for Preventing Misalignment in Vehicle Brake Assemblies" U.S. Appl. No. 15/455,825, filed Mar. 10, 2017.
Non-Final Office Action dated Jul. 5, 2016 from co-pending U.S. Appl. No. 14,317,792.
Final Office Action dated Dec. 13, 2016 from co-pending U.S. Appl. No. 14/317,792.
Examination Report dated Mar. 24, 2014 from German Patent Application No. 10 2013 212 558.5.
Notification of First Office Action in CN Application No. 201410301145.2, dated Nov. 1, 2017.

* cited by examiner

DEVICES AND SYSTEMS FOR PREVENTING MISALIGNMENT IN VEHICLE BRAKE ASSEMBLIES

TECHNICAL FIELD

The present disclosure relates generally to devices and systems for preventing misalignment in vehicle brake assemblies. More specifically, the present disclosure relates to alignment devices, and brake pedal assemblies and methods incorporating such devices, which prevent misalignment between a pedal arm and a brake booster during construction of a vehicle's brake assembly.

BACKGROUND

Motor vehicles may include various braking systems that enable the driver of the vehicle to stop the vehicle by applying pressure to a brake pedal. The brake pedal, for example, is generally connected to the braking system via a pedal arm that transmits the force applied by the driver (i.e., via the pedal) to the braking system. Most contemporary vehicles, which utilize disc braking systems, further include a brake booster that amplifies the braking force provided by the pedal arm.

During construction of a vehicle's brake assembly, the brake booster is generally coupled to the pedal arm via a standard clevis connection, for example, in which a clevis attached to the booster is fit over the pedal arm (i.e., in alignment with a set of bushing holes in the pedal arm), and a clevis pin is inserted to attach the booster to the pedal arm. Although the clevis assembly is intended to guide the brake booster into proper alignment with the pedal arm, there is room for operator error during the construction process, which may result in various misalignments between the booster and pedal arm. Such misassemblies between the booster and pedal arm (which are both critical portions of the vehicle's braking system) may, for example, lead to the malfunction and/or failure of the braking system, which poses a great safety concern, as well as requiring costly repairs to the vehicle.

It may, therefore, be advantageous to provide alignment devices, and brake pedal assemblies and methods incorporating such devices, which prevent misalignment between the pedal arm and brake booster during construction of a vehicle's brake assembly.

SUMMARY

In accordance with various exemplary embodiments of the present disclosure, an alignment device may include a saddle element configured to sit on a pedal arm of a brake assembly. The saddle element may include first and second U-shaped ends configured to receive the pedal arm. The first and second U-shaped ends may be spaced apart from one another by an opening defined by first and second lateral wing elements. The first and second lateral wing elements may form a catchment area configured to guide and position a push rod of a brake booster into alignment with the pedal arm.

In accordance with various additional exemplary embodiments, a vehicle brake pedal assembly may include a pedal arm comprising a pair of bushing holes on opposite sides of the arm. The assembly may further include an alignment device comprising a saddle element comprising first and second U-shaped ends that receive the pedal arm. The first and second U-shaped ends may be spaced apart from one another by an opening defined by first and second lateral wing elements. The first and second lateral wing elements may form a catchment area configured to guide and position a push rod of a brake booster into alignment with the pedal arm.

In accordance with various further exemplary embodiments, a method of constructing a vehicle brake assembly may include joining an alignment device with a pedal arm. The alignment device may include a pair of wings extending outwardly relative to the pedal arm and defining a catchment area between the wings. The method may further include guiding a push rod of a brake booster into the catchment area to align the push rod with the pedal arm; and coupling the push rod to the pedal arm.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates a device for preventing misalignment in a vehicle brake assembly comprising a pair of lateral wing elements that form a catchment area (i.e., spanning between the wings). For instance, the embodiments described herein contemplate an alignment device that is configured to be affixed to a pedal arm of the brake assembly, and which may guide and position a push rod of a brake booster into proper alignment with the pedal arm via the catchment area during construction of the brake assembly.

Various embodiments described herein, for example, contemplate an alignment device comprising a saddle element that is configured to sit on the pedal arm. The saddle element comprises first and second U-shaped ends that are configured to receive the pedal arm. In various embodiments, for example, the first and second U-shaped ends are spaced apart from one another by an opening that is defined by first and second lateral wing elements. In this manner, when the device is seated on the pedal arm, the wing elements may extend angularly outward from the pedal arm (which is exposed via the opening) to guide and position a clevis of the push rod into proper alignment with the pedal arm (i.e., through the opening in the structure), thereby preventing misassembly of the booster and pedal arm.

Figure 1:
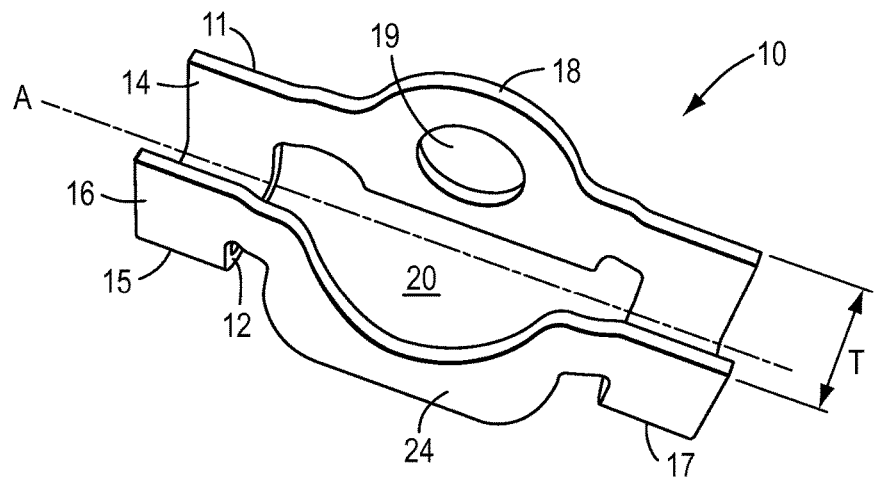
FIG. 1 is a perspective view of an exemplary embodiment of an alignment device in accordance with the present disclosure.
Figure 2:
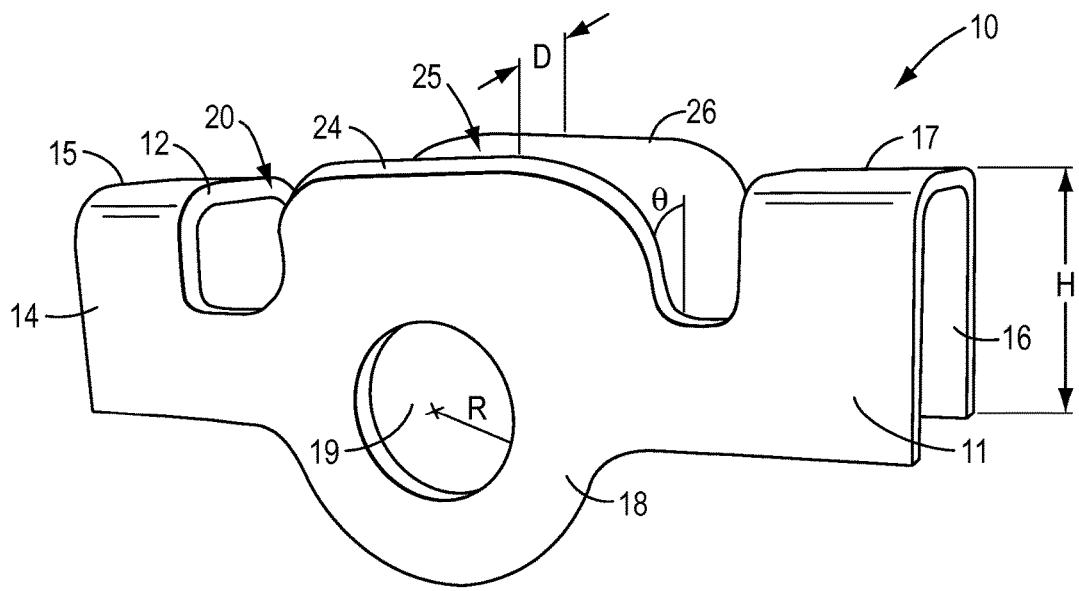
FIG. 2 is another perspective view of the alignment device of FIG. 1.
Figure 3:
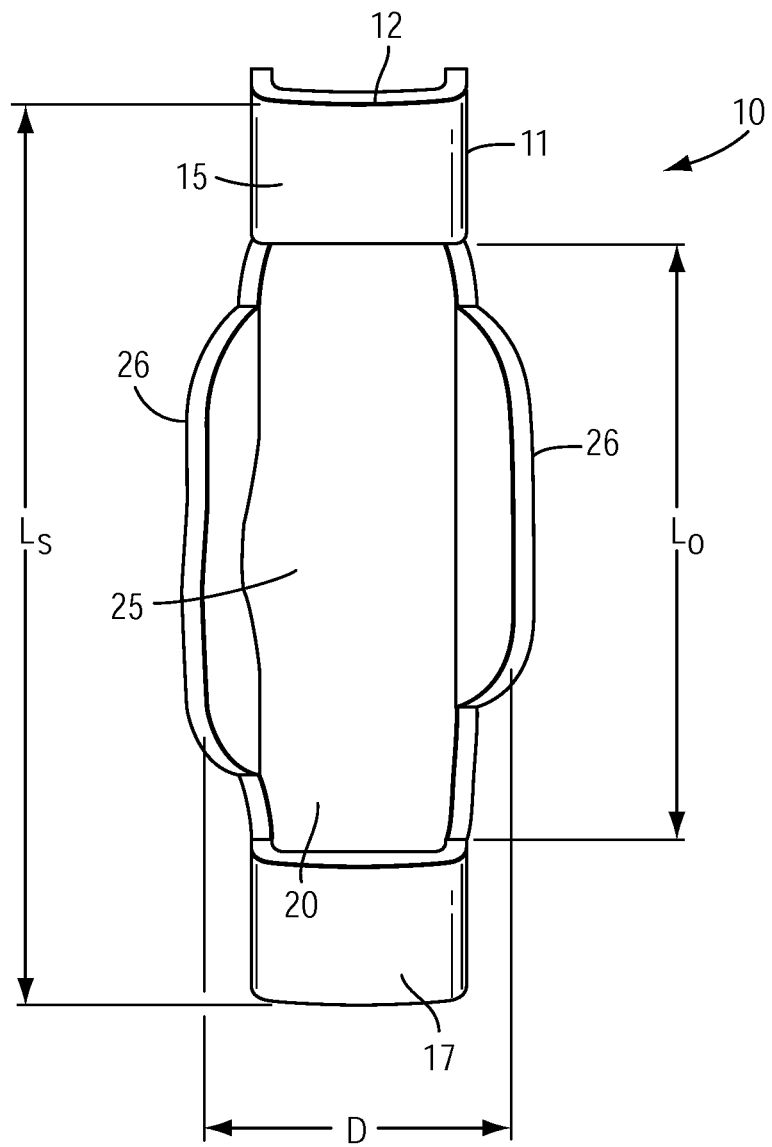
FIG. 3 is a top view of the alignment device of FIG. 1.

FIGS. 1-3 illustrate an exemplary embodiment of an alignment device 10 in accordance with the present disclosure. The alignment device 10 includes a saddle element 11 comprising a base 12 and a pair of sidewalls 14, 16. As shown in FIGS. 1 and 2, the sidewalls 14, 16 of the saddle element 11 extend in parallel from the base 12 to form first and second U-shaped ends 15, 17 that are configured to receive a pedal arm of a vehicle brake assembly. As shown best perhaps in FIG. 3, the first and second U-shaped ends 15, 17 are spaced apart from one another by an opening 20 that is defined by first and second wing elements 24, 26 (which extend angularly outward from each respective sidewall 14, 16). In various additional embodiments, at least one of the sidewalls 14, 16 may include a flange 18 with a circular bore 19 such that, when the device 10 is seated on the pedal arm, the bore in the sidewall is aligned with a bushing hole in the pedal arm (see FIG. 4).

As illustrated in FIGS. 1-4, in various exemplary embodiments, the saddle element 11 is, therefore, substantially U-shaped such that, when the device 10 is seated on the pedal arm, the device 10 wraps at least partially around the pedal arm to envelope an area in which a brake booster is coupled to the pedal arm (see FIG. 4), while still allowing access to this area through the opening 20 between the U-shaped ends 15, 17. In various embodiments, for example, the saddle element may have a length $L_S$ of about 84.5 mm to about 85.5 mm, a height H of about 22.5 mm to about 23.5 mm, and a thickness T of about 21.0 mm to about 22.0 mm, with an opening 20 having the same thickness T extending a length $L_O$ of about 57 mm to about 58 mm along a longitudinal axis A of the saddle element 11 (i.e., extending a length $L_O$ between the u-shaped ends 15, 17).

As illustrated in FIGS. 2 and 3, the lateral wing elements 24, 26 extend outwardly from each respective sidewall 14, 16 at an angle θ to define the opening 20. In various embodiments, for example, the opening 20 may extend along the base 12 of the saddle element 11 (i.e., along the longitudinal axis A of the device 10) between the U-shaped ends 15, 17. In various embodiments for example, the wings 24, 26 may extend outwardly from each respective sidewall 14, 16 at an angle θ of about 26 degrees to about 36 degrees.

The wing elements 24, 26 may, therefore, define a catchment area 25 spanning a distance D across the saddle element 11 and opening 20. In various embodiments, for example, the catchment area 25 may span a distance D of about 29 mm to about 30 mm across the saddle element 11. In other words, the wing elements 24, 26 may have a wingspan of about 35 mm to about 36 mm that is oriented substantially perpendicular to the longitudinal axis A of the alignment device 10.

Thus, when the alignment device 10 is seated on the pedal arm, the wing elements 24, 26 may extend outwardly (e.g., at an angle θ) from each side of the pedal arm to catch a push rod of a brake booster (i.e., within the catchment area 25) and guide and position the push rod into proper alignment with the pedal arm (i.e., through the opening 20 between the U-shaped ends 15, 17). That is, the wing elements 24, 26 form a guide that is configured to receive prong elements of the push rod and align those elements on either side of the push rod so that the prongs are between a respective wing element 24, 26 and side wall of the pedal arm (See, e.g., FIG. 6).

Those of ordinary skill in the art would understand that the alignment device 10 described above with reference to the embodiment of FIGS. 1-4 is exemplary only and that alignment devices in accordance with the present disclosure may have various configurations, shapes (i.e., having various cross-sections), and/or dimensions, which include various configurations, shapes, and/or dimensions of openings 20 and wing elements 24, 26, without departing from the scope of the present disclosure and claims. Furthermore, alignment devices in accordance with the present disclosure may be formed of various materials, including, but not limited to, steel, aluminum, plastic, ceramic, and/or various composites thereof.

Figure 4:
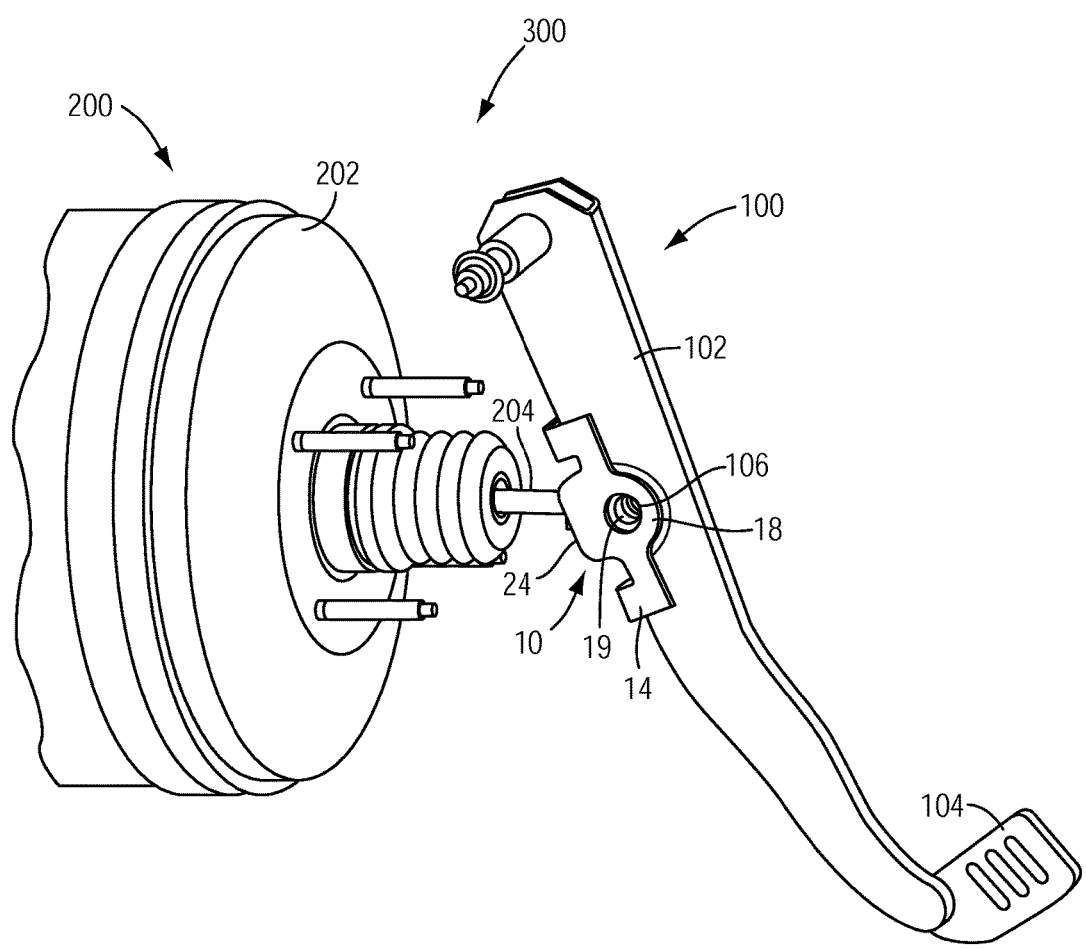
FIG. 4 is a perspective view of an exemplary embodiment of a brake assembly including a brake pedal assembly in accordance with the present disclosure, which illustrates the alignment device of FIG. 1 affixed to a pedal arm of the brake pedal assembly.
Figure 5:
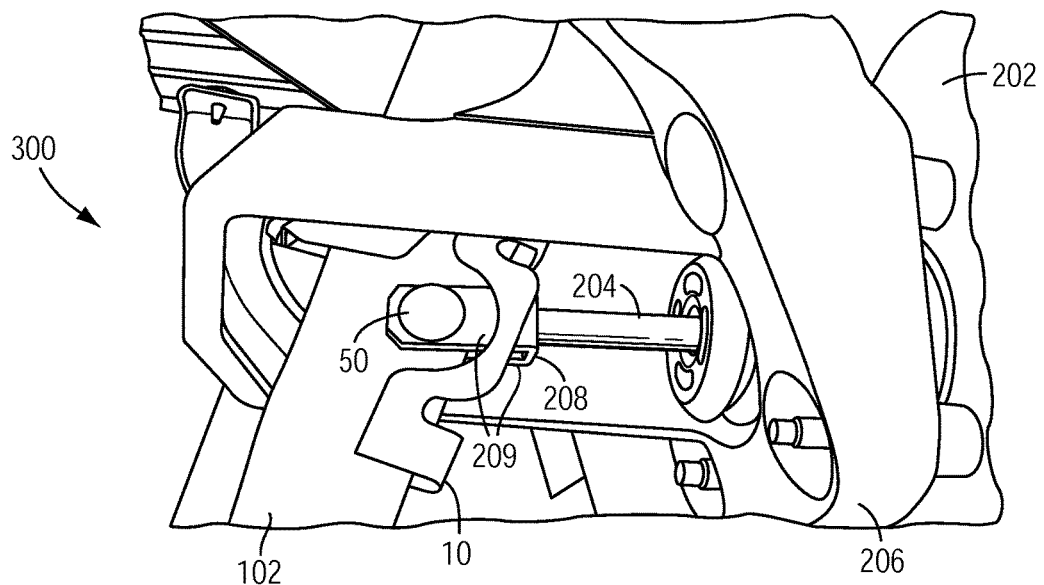
FIG. 5 is a partial, side view of the vehicle brake assembly of FIG. 4.
Figure 6:
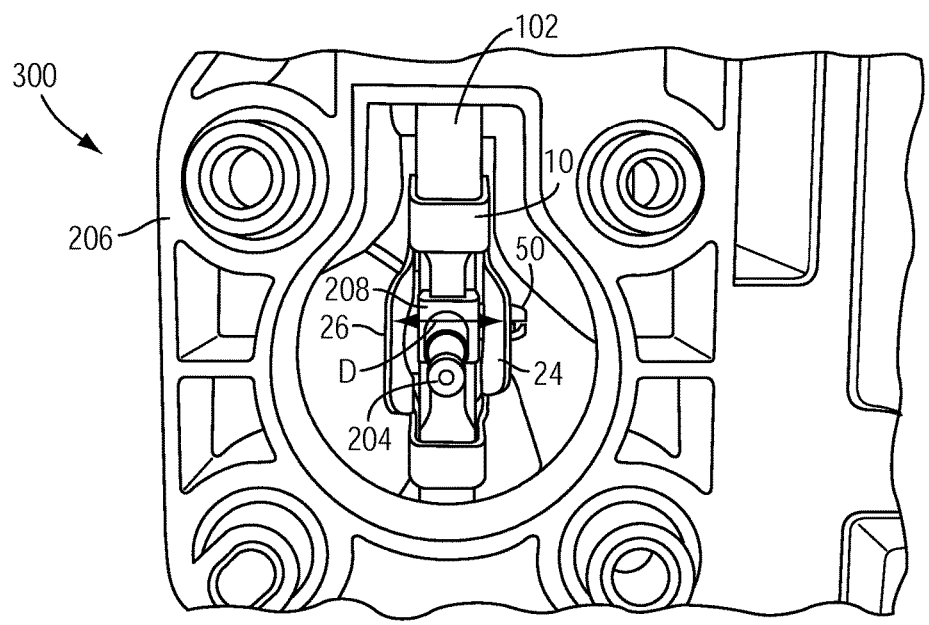
FIG. 6 is a partial, front view of the vehicle brake assembly of FIG. 4.

Various additional embodiments of the present disclosure contemplate a brake pedal assembling including an alignment device 10 as described above. FIGS. 4-6 illustrate, for example, a vehicle brake assembly 300 comprising a vehicle brake pedal assembly 100 that is coupled to a brake booster assembly 200. Those of ordinary skill in the art would understand that the vehicle brake assembly 300 of FIGS. 4-6 is exemplary only and that such assemblies may have various configurations and/or additional components that are not illustrated in the figures. A booster bracket 206 and a clevis pin 50 are not illustrated in the view of FIG. 4, for example, to provide a better view of the brake pedal assembly 100.

The brake pedal assembly 100 includes a pedal arm 102, a brake pedal 104, and an alignment device 10. In various exemplary embodiments, the alignment device 10 is integrally formed with the pedal arm 102. In various additional embodiments, the alignment device 10 is affixed to the pedal arm 102. For example, in various embodiments, the alignment device may be welded to the pedal arm 102.

As above, the alignment device 10 includes a saddle element 11 that wraps at least partially around the pedal arm 102 to envelope the area on the pedal arm 102 in which the brake booster assembly 200 is coupled to the pedal arm 102, while still allowing access to this area through an opening 20 between first and second U-shaped ends 15, 17 of the saddle element 11. As best shown perhaps in FIG. 4, in various embodiments, for example, at least one of the sidewalls 14, 16 of the saddle element 11 may include a flange 18 with a circular bore 19 (the sidewall 24 including the flange 18 in the illustrated embodiment of the alignment device 10), and the alignment device 10 may be positioned on the pedal arm 102 such that the circular bore 19 in the sidewall 24 is aligned with a bushing hole 106 in the pedal arm 102.

As shown best perhaps in FIG. 6, the opening 20 is defined by first and second wing elements 24, 26, which extend outwardly from each respective sidewall 14, 16 of the saddle element 11 (e.g., at an angle θ) on each side of the pedal arm 102. In this manner, the wing elements 24, 26 may form a catchment area 25 spanning a distance D across the pedal arm 102 (i.e., across the saddle element 11 and the opening 20) to guide and position the brake booster assembly 200 into proper alignment with the pedal arm assembly 100.

In various embodiments, for example, the brake booster assembly 200 comprises a brake booster 202 having a push rod 204 that is configured to be coupled to the pedal arm 102 via a clevis 208. The pedal arm 102 comprises, for example, a pair of bushing holes 106 on opposite sides of the arm 102 (only one bushing hole 106 being visible in the view of FIG. 4), which are configured to be aligned with holes in the clevis 208. As would, therefore, be understood by those of ordinary skill in the art, when the brake booster 202 is in proper alignment with the pedal arm 102 (i.e., in a position to be properly assembled with the pedal arm 102), the clevis 208 will sit on the pedal arm 102 such that a hole 210 in each prong 209 of the clevis 208 aligns with one of the bushing holes 106 of the pedal arm 102 (i.e., such that the prongs 209 of the clevis 208 rest on opposite sides of the pedal arm 102). A clevis pin 50 may then be inserted through the aligned holes 210 and 106 to secure the push rod 204 to the pedal arm 102.

Figure 7:
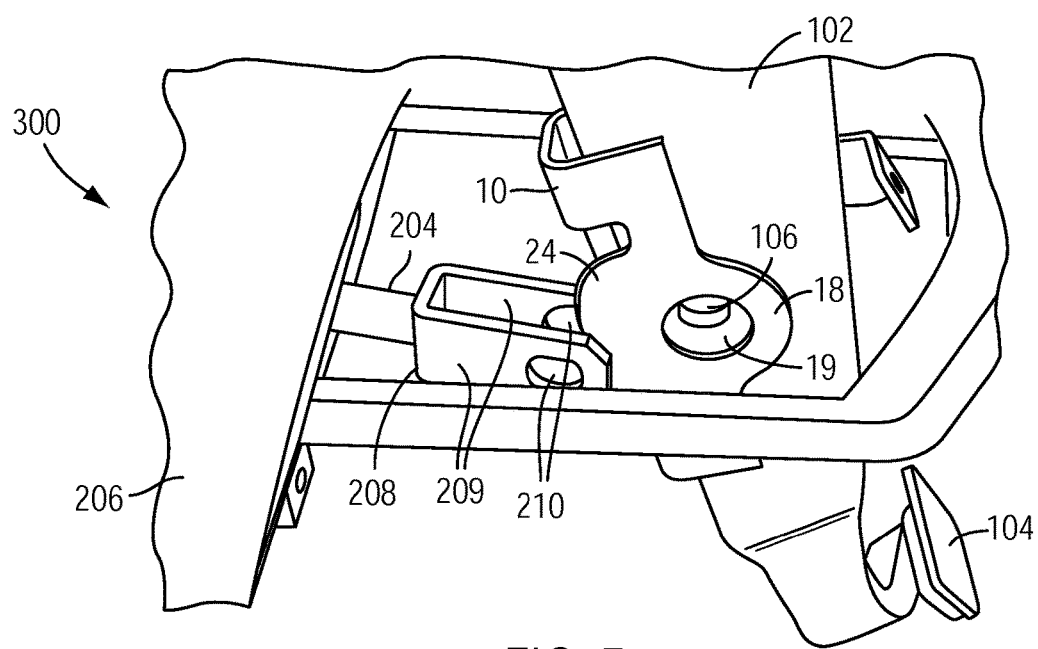
FIG. 7 is a partial, side view of the vehicle brake assembly of FIG. 4 illustrating how the alignment device prevents misalignment of a brake booster and the pedal arm.
Figure 8:
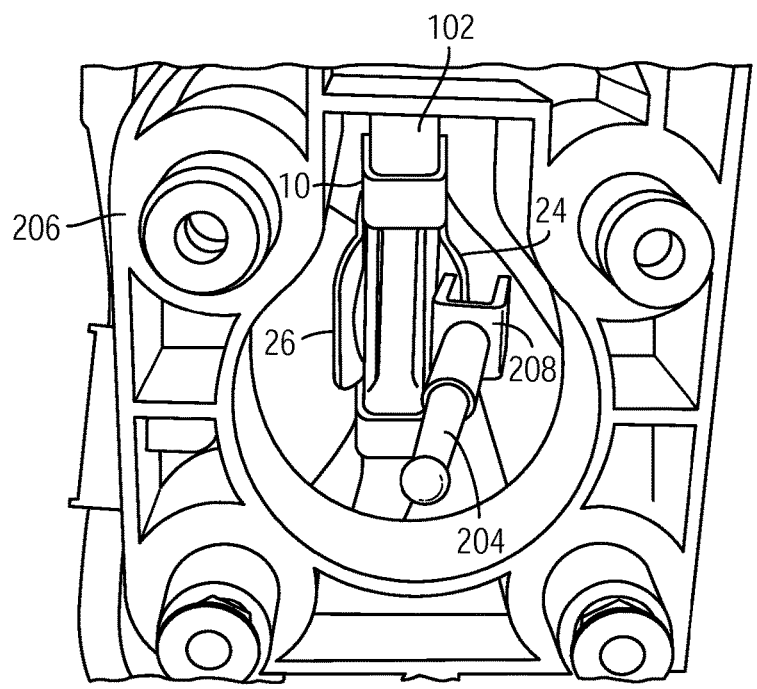
FIG. 8 is a partial, front view of the vehicle brake assembly of FIG. 4 illustrating how the alignment device prevents misalignment of the brake booster and the pedal arm.

As shown in FIGS. 5-8, the wing elements 24, 26 of the alignment device 10 may, therefore, extend outwardly from each side of the pedal arm 102 to catch the push rod 204 of the brake booster 202 (i.e., within the catchment area 25) and guide and position the push rod 204 into proper alignment with the pedal arm 102 (i.e., through the opening 20 between the U-shaped ends 15, 17). In this manner, as shown in FIGS. 7 and 8, the wing elements 24, 26 may prevent the clevis 208 of the push rod 204 from being misaligned with the pedal arm 102 (e.g., by being positioned along one side of the pedal arm 102), by preventing the alignment of the holes 210 and 106, and thus insertion of the clevis pin 50, unless the clevis 208 is properly aligned with the pedal arm 102. In other words, the wing elements 24, 26 may guide the clevis 208 over the pedal arm 102 such that a prong 209 is positioned on each side of the pedal arm 102 and the holes 210 of the clevis 208 are in alignment with the bushing holes 106 of the pedal arm 102.

In various embodiments, for example, the push rod 204 is generally allowed only about 7 mm of movement in any one direction, and the alignment device 10 is dimensioned such that it is not possible to move the clevis 208 of the push rod 204 out of alignment with the pedal arm 102 (within its allotted area of movement) without the wing elements 24, 26 interfering with the clevis 208. In accordance with various embodiments, for example, there is a span of about 16.4 mm between the prongs 209 of the clevis 208, and only a space of about 4.5 mm between a side portion of the pedal arm 102 and the alignment device 10 (i.e., when the alignment device 10 is seated on the pedal arm 102). The clevis 208 will, therefore, not fit between the alignment device 10 and the pedal arm 102, and the wing elements 24, 26 will interfere with the prongs 208 of the clevis 208 if the push rod 204 is rotated outward within its 7 mm of movement.

Those of ordinary skill in the art would understand that the vehicle brake pedal assembly 100 described above with reference to the embodiment of FIGS. 4-8 is exemplary only and that vehicle brake pedal assemblies in accordance with the present disclosure may have various configurations and/or components, including various types and/or configurations of pedal arms 102 and brake pedals 104, without departing from the scope of the present disclosure and claims. Furthermore, as above, vehicle brake pedal assemblies in accordance with the present disclosure may include various configurations of alignment devices 10, having various shapes and/or dimensions, which are joined to the pedal arm 102 via various methods and/or techniques.

The present disclosure further contemplates methods of constructing a vehicle brake assembly, such as, for example, the vehicle brake assembly 300 including the vehicle brake pedal assembly 100 and the brake booster assembly 200 described above with reference to FIGS. 4-8. In accordance with various exemplary embodiments, to construct a vehicle brake assembly 300, an alignment device 10 is joined to a pedal arm 102 of the vehicle brake pedal assembly 100. As above, the alignment device 10 includes a pair of lateral wing elements 24, 26 extending outwardly relative to the brake pedal arm 102 to define a catchment area 25 between the wing elements 24, 26.

In various embodiments, for example, the alignment device 10 may be joined to the pedal arm 102 by welding the alignment device 10 to the pedal arm 102. In various additional embodiments, the alignment device 10 may be integrally formed with the pedal arm 102, such as, for example, by being molded with the pedal arm 102. As would be understood by those of ordinary skill in the art, however, the alignment device 10 may be joined to the pedal arm 102 using various techniques and/or methods, without departing from the scope of the present disclosure and claims.

A push rod 204 of a brake booster 202 (i.e., of the brake booster assembly 200) is then guided into the catchment area 25 (i.e., defined by the wing elements 24, 26) to align the push rod 204 with the pedal arm 102. As above, in various embodiments, the pedal arm 102 includes a pair of bushing holes 106 on opposite sides of the pedal arm 102, which are configured to be aligned with holes in a clevis 208 at an end of the push rod 204. Thus, the push rod 204 is guided into the catchment area 25 such that the clevis 208 at the end of the push rod 204 is aligned with the pedal arm 102. In other words, the clevis 208 is guided over the pedal arm 102 by the wing elements 24, 26, such that a prong 209 on each side of the clevis 208 is positioned on each side of the pedal arm 102 and a hole 210 in each prong 209 is aligned with one of the bushing holes 106 in the pedal arm 102.

When the push rod 204 is in proper alignment with the pedal arm 102, the push rod 204 is then coupled to the pedal arm 102, for example, by inserting a clevis pin 50 through the aligned holes 210 and 106 of the clevis 208 and the pedal arm 102. As shown in FIGS. 7 and 8, for example, when the push rod 204 is not in proper alignment with the pedal arm 102, the clevis pin 50 may not be inserted, but is instead obstructed by the wing element 24, thereby preventing misassembly of the brake pedal assembly 100 and the brake booster assembly 200 during construction of the vehicle brake assembly 300. As above, the push rod 204 is generally allowed only about 7 mm of movement in any one direction, and the alignment device 10 is dimensioned such that it is not possible to move the clevis 208 of the push rod 204 out of alignment with the pedal arm 102 without the wing elements 24, 26 interfering with the clevis 208.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to motor vehicles incorporating power braking systems, those of ordinary skill in the art would understand that the present teachings as disclosed would work equally well for any type of vehicle, incorporating any type of braking system, which utilizes a similar clevis-type connection.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A method of constructing a vehicle brake assembly, comprising:
   joining an alignment device with a pedal arm, the alignment device comprising a pair of wings extending outwardly relative to the pedal arm and defining a catchment area between the pair of wings;
   subsequently guiding a clevis into the catchment area with an end portion of a push rod of a brake booster to align the clevis with the pedal arm; and
   coupling the clevis to the pedal arm.

2. The method of claim 1, wherein joining the alignment device to the pedal arm comprises welding the alignment device to the pedal arm.

3. The method of claim 1, wherein joining the alignment device to the pedal arm comprises forming the alignment device with the pedal arm.

4. The method of claim 1, wherein aligning the clevis with the pedal arm comprises guiding the clevis over the pedal arm such that the pedal arm is positioned between a pair of prongs of the clevis and a hole in each of the pair of prongs is aligned with a bushing hole in the pedal arm.

5. The method of claim 4, wherein coupling the clevis to the pedal arm comprises inserting a pin through the aligned holes of the clevis and the pedal arm.

6. The method of claim 1, wherein coupling the clevis to the pedal arm secures the push rod to the pedal arm.

7. The method of claim 1, further comprising, prior to guiding the clevis with the push rod, securing the clevis to the end portion of the push rod.

* * * * *